United States Patent [19]
Maeda

[11] Patent Number: 5,159,481
[45] Date of Patent: Oct. 27, 1992

[54] POLARIZATION SCRAMBLER FOR POLARIZATION-SENSITIVE OPTICAL DEVICES

[75] Inventor: Mari W. Maeda, Atlantic Highlands, N.J.

[73] Assignee: Bell Communications Research, Inc., Livingston, N.J.

[21] Appl. No.: 583,786

[22] Filed: Sep. 14, 1990

[51] Int. Cl.$^5$ .............................. H04B 10/06
[52] U.S. Cl. .................................. 359/189; 359/192; 385/11
[58] Field of Search ................ 455/616, 619; 359/192, 359/156, 189, 195, 154; 385/11

[56] References Cited

U.S. PATENT DOCUMENTS

| | | | |
|---|---|---|---|
| 4,779,959 | 10/1988 | Saunders | 350/346 |
| 4,903,342 | 2/1990 | Yamazaki | 455/619 |
| 4,923,290 | 5/1990 | Brinkmeyer et al. | 385/11 |
| 5,008,958 | 4/1991 | Cimini | 455/619 |
| 5,023,949 | 6/1991 | Auracher | 455/619 |
| 5,031,236 | 7/1991 | Hodgkinson et al. | 359/189 |

OTHER PUBLICATIONS

Hodkinson, "Polarization Insensitive Heterodyne Detection Using Polarization Scrambling" Electronic Letters, May 7, 1987, vol. 23 #10 pp. 513-514.
L. G. Cohen, "Measured Attenuation and Deposition of Light Transmitted Along Glass Fibers," The Bell System Technical Journal, 1971, vol. 50, pp. 23-42.
I. McMichael et al., "Correction of polarization and modal scrambling in multimode fibers by phase conjugation," Optics Letters, 1987, vol. 12, pp. 507-509.
A. M. Bykov et al., "Transmission of linearly polarized light through bent multimode lightguides," Soviet Journal of Optical Technology, 1983, vol. 50, pp. 215-216.
R. H. Stolen et al., "Linear polarization in birefringent multimode fibers," Third International Conference on Integrated Optics and Optical Fiber Communication Digest '81, pp. 112-113.
D. Marcuse, Principles of Optical Fiber Measurements, 1981, Academic Press, pp. 201-203.
F. C. Saunders et al., "Novel optical cell design for liquid crystal devices providing sub-millisecond switching," Optical and Quantum Electronics, 1986, vol. 18, pp. 426-430.
S. D. Personick, Fiber Optics: Technology and Applications, 1985, Plenum Press, pp. 6-45.
T. G. Hodgkinson et al., "Polarization insensitive heterodyne detection using polarization scrambling," Postdeadline Papers: OFC/IOOC '87, Reno, Nev., Jan. 1987, pp. 62-65.
M. Tokuda et al., "Measurement of baseband frequency response of multimode fibre by using a new type of mode scrambler," Electronics Letters, 1977, vol. 13, pp. 146-147.

Primary Examiner—Edward L. Coles, Sr.
Assistant Examiner—Kinfe-Michael Negash
Attorney, Agent, or Firm—Leonard Charles Suchyta; Charles S. Guenzer

[57] ABSTRACT

A polarization scrambler comprising a multi-mode fiber spirally or preferably toroidally wrapped about a cylinder or toroid. The multi-mode fiber receives an optical signal from a long single-mode fiber. The optical output of the scrambler has an equal distribution of the two polarization states. Therefore, it can be passed through a polarization-sensitive filter or other optical device. The invention allows a low-cost receiver in a wavelength-division multiplexing communications system.

18 Claims, 1 Drawing Sheet

POLARIZATION SCRAMBLER FOR POLARIZATION-SENSITIVE OPTICAL DEVICES

FIELD OF THE INVENTION

The invention relates generally to optical fibers; in particular, it relates to optical filters or other polarization-dependent elements connected with optical fibers.

BACKGROUND ART

Optical fibers are quickly replacing copper cable as the transmission medium for communication systems, such as the long-distance and local telephone networks and as interconnects within a computer system. The extremely wide bandwidth of optical fibers allows the optical carrier to be modulated at very high data rates. Available electronic hardware allows data signals to be modulated on one end of the fiber and detected on the other end at data rates of nearly 10 Gbit/sec.

The absorption of optical fibers has been reduced to the point where an optical signal can propagate for hundreds of kilometers on an optical fiber without the need for intermediate amplification or regeneration. However, the combination of long distance and high data rates presents the problem of dispersion on the fiber. An optical signal, usually in the form of well defined pulses at the transmitting end, may contain a number of spatial modes. Different spatial modes represent the allowed eigenmodes for propagation of electromagnetic radiation on the fiber, e.g., the $TE_{mn}$ and $TM_{mn}$ modes. Each of these modes may have a slightly different propagation velocity on the fiber. Therefore, the optical signal that was transmitted as a sharp pulse has its modes spatially dispersed on a long fiber. The spatial dispersion translates to a temporal dispersion at the receiver so that the pulse is received in a distorted form. The dispersion limits the data rates of signals to be accurately transmitted on optical fibers. Multi-mode fibers, that is, those that transmit higher-order modes, permit only very limited distances for transmission or very reduced data rates.

The dispersion problem itself has been brought well under control. Most fibers being installed in the field are single-mode fibers that have a cut-off frequency between the two lowest-order modes. That is, the lowest-order mode propagates along the fiber, while all of the higher-order modes are quickly attenuated. For a step-index fiber having a core diameter $a$, numerical aperture NA, and carrying radiation at a wavelength $\lambda$, there is defined a normalized frequency parameter $$V = 2\pi NAa/\lambda.$$

The number of guided spatial modes is $$N = V^2/2.$$

A step-index fiber become single-mode when $$V < 2.405.$$

With only a single spatial mode propagating on the fiber, there is no spatial mode dispersion. This and other aspects of optical fibers are discussed by S. D. Personick in his book *Fiber Optics: Technology and Applications*, Plenum Press, 1985, pages 6–45.

However, in the cylindrically symmetric geometry of an optical fiber, the lowest order mode is two-fold degenerate, that is, the $TE_{00}$ mode is both orthogonal and equivalent to the $TM_{00}$ mode. These two degenerate modes are usually represented by the electric polarization of the propagating wave. For example, a light wave propagating on an optical fiber lying in the z-direction may have its electric vector lying in the x-direction or in the y-direction or some combination of the two. In the present state of optical fiber technology, there is no control in long fibers over the distribution of the optical power between the two polarization modes. As a fiber goes around a bend, the fiber becomes birefringent, and a previously well defined single polarization mode is transformed into a combination of the two polarization modes. Indeed, the transformations between the two modes appear to depend upon uncontrolled environmental factors which change over time. Therefore, the light wave arriving at the receiver is of unknown, uncontrolled, and temporally varying polarization.

The lack of polarization control would present no problem if the receiver were independent of polarization, that is, polarization insensitive. For example, most optical detectors, such as a PIN detector, are polarization insensitive. However, many modern fiber optic systems transmit multiple signals at different optical frequencies on one fiber. A wavelength-division multiplexing (WDM) system uses multiple laser transmitters lasing at different wavelengths and modulated by different data signals. Their outputs are combined on a single fiber for long-distance distribution. In one WDM architecture, the combined WDM signal is distributed to multiple receivers so that each receiver simultaneously receives a large number of data signals. The receiver then optically filters the entire WDM signal to pass only the desired channel to a wideband photodetector.

The optical filter for such an application should have a narrow passband ($\sim 1$ nm), be electronically tunable over a wide bandwidth, and be economical. Two candidates are acousto-optic filters and liquid-crystal Fabry-Perot etalon filters. Unfortunately, both types of filters are usually designed to operate upon one polarization state of light and will accurately filter only that polarization. Their polarization sensitivity causes operational problems when used in receivers for optical fibers in which there is no control of polarization. With effort, these types of filters may be made insensitive to polarization. Heffner et al. have disclosed a multi-stage polarization-insensitive acousto-optic filter in U.S. Pat. No. 5,002,349. Patel has disclosed a polarization-insensitive liquid-crystal filter in U.S. patent application, Ser. No. 5,068,749, filed Aug. 31, 1990. However, their structures are complex and thus expensive.

A different, systems-level approach to the polarization problem has been disclosed by Hodgkinson et al. in "Polarisation insensitive heterodyne detection using polarization scrambling," *Postdeadline Papers: OFC/I-OOC '87*, Reno, Nev., Jan. 1987, paper PDP15-01, pages 62–65. Their method intentionally provided equal amounts of orthogonal polarizations on the transmitting side. After the optical signal had been data modulated at 20M bit/sec, a $LiNbO_3$ phase modulator polarization scrambled it at 80 MHz so that equal power was given to the orthogonal polarization modes within each data bit. That is, their transmitter polarization scrambled at a rate faster than the data rate. Although such an approach circumvents the slow variations in the fiber's polarization characteristics, the transmitter becomes complex.

Tokuda et al. have considered the problem of launching a controlled distribution of modes onto a multi-mode fiber to be evaluated in "Measurement of baseband frequency response of multimode fibre by using a new type of mode scrambler," *Electronics Letters*, volume 13, 1977, pages 146–147. They guaranteed a uniform mode distribution by wrapping the input end of the multi-mode fiber on a multi-mode scrambler. Their scrambler consisted of the fiber wrapped on a row of closely spaced columns such that the fiber was bent in a corrugated shape. A commercial version of this multi-mode scrambler is available from Newport as Model FM-1. Other mode scramblers are disclosed by D. Marcuse in the book *Principles of Optical Fiber Measurements*, Academic Press, 1981, pages 201–203, for example, a graded-index fiber spliced on either end to a step-index fiber. Even a long length of multi-mode fiber can scramble modes. As far as is known, the problem of polarization scrambling in a passive device has not been addressed. The effectiveness of prior-art multi-mode scramblers for polarization scrambling has not been completely understood.

SUMMARY OF THE INVENTION

Accordingly, an object of the invention is to provide a passive polarization scrambler.

Another object is to provide a polarization-insensitive receiver for a fiber optic communication system.

A further object is to provide polarization insensitivity to narrow-band filters or other optical devices that are based on polarization-sensitive components.

The invention can be summarized as a passive polarization scrambler comprising a multi-mode optical fiber bent around a spatially varying axis. The scrambler converts a single input mode into many spatial modes including both polarization modes. The scrambler is useful for polarization scrambling the input to an optical device, such as a filter, that is polarization-dependent. It can be attached to the receiving end of a single-mode fiber for which the polarization state is not controlled.

DETAILED DESCRIPTION OF THE PREFERRED EMBODIMENT

Figure 1:
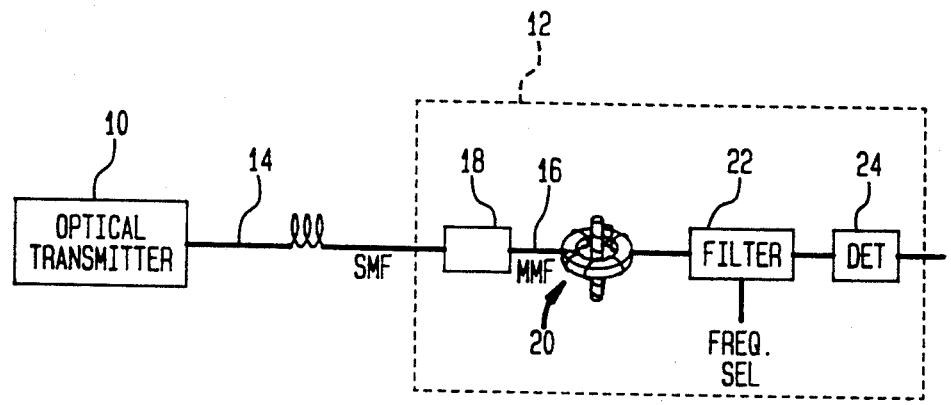
FIG. 1 is a block diagram of an embodiment of the invention.

An optical fiber communication system is illustrated in FIG. 1. An optical transmitter 10 sends a wavelength-division multiplexed (WDM) optical signal to an optical receiver 12 over a substantial length of single-mode optical fiber 14. For the reasons discussed above, single-mode fibers are required for high bit-rate, long-distance fiber communication. The detailed architecture of the communication system and the structure of the optical transmitter 10 are not important to the invention. However, the presence on the single-mode fiber 14 of multiple optical signals of different optical frequencies and their independently determined polarization states creates problems for the design of a low-cost receiver 12. These problems are solved by the invention. For simplicity, it will be assumed that the optical receiver 12 needs to detect only one of the optical signals at a given time but that the choice of signals will change over time. An example would be a fiber 14 carrying multiple subscriber television services to the home, only one of which is used at any time. The receiver 12 thus needs to detect only the optical signal having a optical carrier at one of a number of predetermined frequencies.

According to the invention, at the receiving end, the single-mode fiber 14 is optically coupled to a multi-mode fiber 16 through a coupling element 18, which may be a fusion splice, a detachable connector, or other standard optical coupler. The multi-mode fiber 16 is operatively coupled to a passive polarization scrambler 20. The scrambler 20 converts the lowest-order mode launched onto the multi-mode fiber 16 by the single-mode fiber 14 into a distribution of modes including the lowest-order and higher-order modes. In the process of reaching such a distribution, power becomes nearly equally distributed between the two polarization states.

The scrambled optical signal is then passed through an optical filter 22 or frequency-selective switching element. In a WDM system, it is desired that the passband of the filter be electronically tunable. Such tunability restricts the types of filters that can be used. With the scrambler of the present invention, the filter 22 itself may be polarization-sensitive because there are equal amounts of power in the two polarization states of the scrambled optical signal, regardless of the polarization state at the input to the receiver 12.

The optical output of the filter 22 is detected by an optical detector 24. Because the WDM signal has been filtered at the optical carrier frequency, the detector 24 can be a simple intensity detector having nearly uniform response over the entire WDM band. The electrical output of the detector 24 corresponds to the electrical signal modulating one of the lasers in the optical transmitter 10.

I have used for a polarization scrambler a combination of a toroid having a 6 cm outer diameter and a 4 cm inner diameter and a ~2 cm cylinder transversely penetrating the hole of the toroid. The cylinder was spirally wrapped and the toroid was toroidally wrapped with approximately 20 turns of the multi-mode fiber 16. The continuous bending of the fiber on the toroid and cylinder about an axis of rotation varying in three dimensions acted to scramble the modes including the polarization modes. Multi-mode scramblers are well-known. However, the toroidal scrambler differs from the prior-art multi-mode scramblers in that the bending of the fiber is about a spatially varying axis. Thereby, scrambling into both polarization states is assured.

An advantage of the invention is that it passively scrambles the polarization so that the filter element may be polarization-sensitive. Because of the scrambling, there is equal power in both polarization states. Because polarization-sensitive filters may be used, they can be of much simpler design than the proposed polarization-insensitive filters. Heffner et al. in the above mentioned patent disclosed several relatively simple but polarization-sensitive tunable acousto-optic filters. Bulk acousto-optic filters are commercially available.

An attractive tunable filter is a polarization-sensitive liquid-crystal filter, particularly a Fabry-Perot etalon filter. Such a filter is disclosed by Saunders in U.S. Pat. No. 4,779,959 and by Saunders et al. in "Novel optical cell design for liquid crystal devices providing sub-millisecond switching," *Optical and Quantum Electronics*, volume 18, 1986 at pages 426–430.

To ensure that the polarization-sensitive filter provides the desired frequency response, a polarizer may be set between the scrambler and filter with its polarization angle set to that of the filter.

Different geometries for polarization scramblers have been evaluated. A single-mode fiber incurred an intensity variation of 40 dB, due to lack of polarization control, to be described later. For the toroid/cylinder scrambler wrapped with 50/125 fiber, the variation was measured as 1.4 dB. The designation "50/125" indicates a core diameter of 50 μm and a cladding diameter of 125 μm. A equivalent straight length of 50/125 multi-mode fiber should incur a variation between 3 dB to 10 dB. For a 50/125 fiber spirally wound on a cylinder, the variation is estimated to be 3-6 dB. The polarization scrambling of the corrugated structure of Tokuda et al. remains undetermined. Toroidal wrapping on a toroid should provide polarization scrambling. Generally, a larger-core 62.5/125 fiber provides better scrambling than the 50/125 fiber.

EXPERIMENTS

Figure 2:
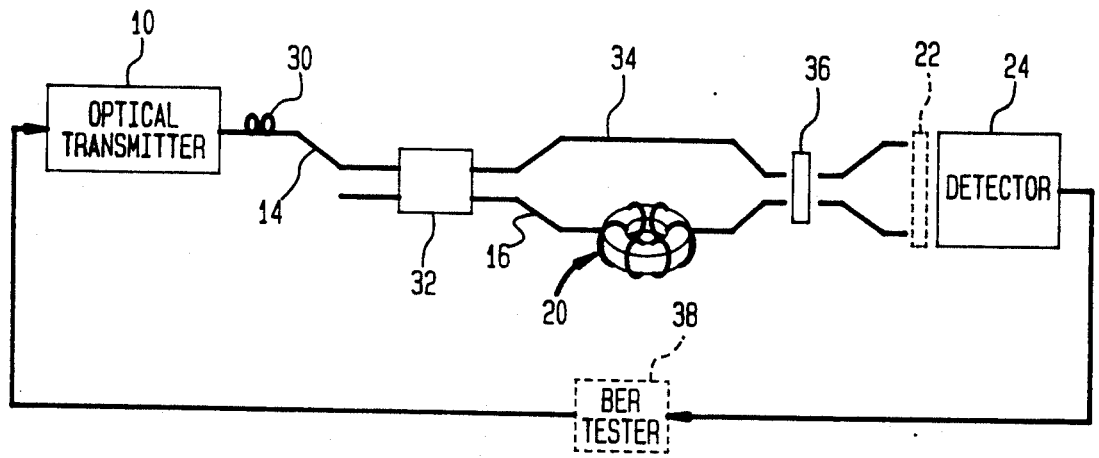
FIG. 2 is a block diagram of an experimental apparatus useful for evaluating the invention.

The test apparatus illustrated in FIG. 2 was used in a series of experiments to verify the concept of mode scrambling. A laser included in the optical transmitter 10 emitted at 1545 nm and launched a light wave onto the single-mode fiber 14. A manually operated polarization controller 30 adjusted the input state of polarization. A 3-dB coupler 32 divided the input signal onto both the multi-mode fiber 16 and a single-mode bypass fiber 34. After the multi-mode fiber 16 had passed through the previously described toroid/cylinder scrambler 20, the signals from both fibers 16 and 34 passed through a common sheet polarizer 36 via unillustrated grin-lens collimators. The multi-mode fiber 16 was about 60 cm of 50/125 multi-mode fiber available from Siecor. The detector 24 could be positioned to detect either the scrambled output of the multi-mode fiber 16 or the unscrambled output of the bypass fiber 34.

In a first experiment, the polarization controller 30 was randomly varied over all polarization angles to simulate the time-varying birefringence of the single-mode fiber 14 and 34. Simultaneously, the intensity detected by the detector 24 was monitored for either the scrambled or unscrambled output. The detector 24 measured 40 dB excursions in the detected power of the unscrambled signal. On the other hand, it measured only 1.4 dB variations in the scrambled power.

In another experiment, a polarization-sensitive, electronically tunable liquid-crystal etalon filter 22 of the sort described above was placed in line of either the scrambled or unscrambled output between the polarizer 36 and the detector. However, the specially fabricated filter differed from that of Saunders in that the end mirrors were dielectric stacks. It used nematic liquid crystal E7 commercially available from EM Chemicals inserted in a cavity length of approximately 11 μm. Alignment layers were interposed between the dielectric mirrors and the liquid crystal. Transparent indium tin oxide electrodes were deposited on the glass substrates.

Figure 3:
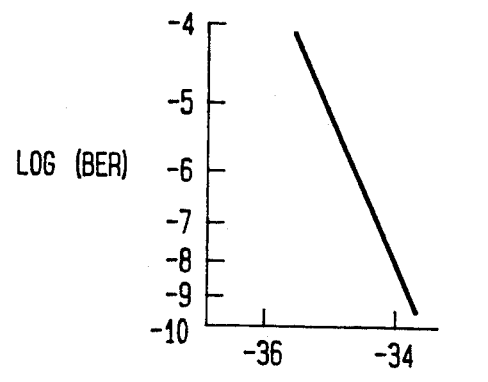
FIG. 3 is a plot of the bit-error rate versus received optical power with and without use of the invention.

A bit-error rate tester 38 modulated a pseudo-random pattern on the laser of the transmitter 10 at 620 Mb/sec and compared it to the signal from the detector 24 to compute a bit-error rate (BER). The bit-error rate was then measured as a function of received power for both the scrambled and unscrambled outputs. In both cases, it followed the dependence shown in FIG. 3. Thus, there was no apparent noise penalty using the scrambler.

Although the invention has been described in relation to an optical filter, other systems can benefit by its use. There have been proposals both to use acousto-optic devices and to use liquid crystal devices as switches in a single-frequency or a WDM communication system. In WDM, the channels to be switched would correspond to different carrier frequencies. Such a switch would necessarily become polarization insensitive when a scrambler mixes the polarizations of its unswitched input.

A further application of the invention is to optical spectrometers. A typical precision spectrometer uses a diffraction grating that is rocked in order to measure an intensity spectrum with an optical intensity detector set at a corresponding angle with respect to the input beam. However, the diffraction efficiency depends on the polarization of the light incident on the grating and further depends upon the diffraction angle, which directly corresponds to the wavelength of light being measured. Thus, an uncontrolled polarization of the light to be measured produces an uncertainty in the spectral dependence. This uncertainty can be removed by using a multi-mode fiber to convey the light to be measured to the grating and by connecting the fiber to a polarization scrambler. In this application, a single-mode fiber is not required for practice of the invention.

Although the invention has been described with respect to cylindrically symmetric optical fibers, other types of waveguiding structures could beneficially use certain aspects of the invention. For example, single-mode or multi-mode semiconductor or silica optical waveguides can be formed on a substrate as part of an optical or optoelectronic integrated circuits. A polarization scrambler can be incorporated into such a circuit.

The invention thus provides an inexpensive solution to providing polarization insensitivity to optical filters and other polarization-sensitive components. The polarization scrambler can be easily combined with existing optical fiber links. The 3 dB loss incurred when the filter is sensitive to only one polarization is acceptable compared to the error margins which must otherwise be established.

What is claimed is:

1. An optical receiver, comprising:
    a multi-mode optical waveguide for carrying an optical signal having an optical frequency, said multi-mode waveguide being multi-mode at said optical frequency;
    a passive scrambler operatively associated with said multi-mode optical waveguide for scrambling optical polarization modes on said multi-mode optical waveguide, thereby producing a scrambled optical signal; and
    a device receiving said scrambled optical signal as an optical input signal and processing said optical input signal according to a transfer characteristic, wherein said transfer characteristic is dependent upon a polarization state of said optical input signal.

2. An optical receiver as recited in claim 1, wherein said multi-mode optical waveguide is a multi-mode optical fiber.

3. An optical receiver, comprising:
    a multi-mode optical fiber for carrying an optical signal having an optical frequency, said multimode waveguide being multi-mode at said optical frequency;

a passive scrambler operatively associated with said multi-mode optical fiber for scrambling optical polarization modes on said multi-mode optical fiber, thereby producing a scrambled optical signal, wherein said scrambler comprises bending means for having said multi-mode optical fiber prefabricated in a bent shape; and a device receiving said scrambled optical signal as an optical input signal and processing said optical input signal according to a transfer characteristic, wherein said transfer characteristic is dependent upon a polarization state of said optical input signal.

4. An optical receiver as recited in claim 3, wherein said bending means bends said multi-mode optical fiber about and along a length of a spatially varying axis.

5. An optical receiver as recited in claim 3:
wherein said device is a frequency-selective device; and
further comprising an optical detector receiving an optical output of said frequency-selective device.

6. An optical receiver as recited in claim 5 wherein said frequency-selective device is an electronically tunable optical filter passing a selected frequency component of said optical signal.

7. An optical receiver as recited in claim 6, wherein said optical filter comprises an acousto-optic filter.

8. An optical receiver as recited in claim 6, wherein said optical filter comprises a liquid-crystal filter.

9. An optical receiver as recited in claim 3:
further comprising a single-mode fiber carrying said optical signal, said single-mode fiber being single-mode at said optical frequency; and
wherein said multi-mode fiber is coupled to said single-mode fiber to receive said optical signal.

10. An optical receiver as recited in claim 9, wherein said device comprises an electronically tunable optical filter passing a selected frequency component of said optical signal and further comprising an optical detector detecting an intensity of said selected frequency component.

11. An optical receiver as recited in claim 3, wherein said bent shape is a corrugated shape.

12. A polarization insensitive scanning receiver, comprising:
a multi-mode optical waveguide carrying an optical signal the intensity of which is to be measured, said multi-mode waveguide being multi-mode at an optical frequency of said optical signal;
a polarization mode scrambler operatively connected with said waveguide;
a tunable optical frequency filter receiving said optical signal from said waveguide; and
an optical intensity detector receiving an output of said filter.

13. A receiver as recited in claim 12, wherein said filter is continuously tunable.

14. A receiver as recited in claim 12, wherein said multi-mode optical waveguide is a multi-mode optical fiber.

15. A receiver as recited in claim 14, wherein said polarization mode scrambler includes said multi-mode optical fiber prefabricated in a corrugated shape.

16. A communication method, comprising the steps of:
conveying a multi-frequency optical signal on a single-mode optical waveguide, said single-mode optical waveguide being single-mode at a frequency of said multi-frequency optical signal;
transferring said multi-frequency optical signal from said single-mode optical waveguide to a multi-mode optical waveguide, said multi-mode waveguide being multi-mode at said optical frequency;
scrambling optical polarization modes of any optical signal carried on said multi-mode optical waveguide; and
separating out a selected optical component of said multi-frequency optical signal scrambled by said scrambling step.

17. A communication method, comprising the steps of:
conveying a multi-frequency optical signal on a single-mode optical waveguide, said single-mode optical waveguide being single-mode at an optical frequency of said multi-frequency optical signal;
transferring said multi-frequency optical signal from said single-mode optical waveguide to a multi-mode optical waveguide, said multi-mode waveguide being multi-mode at said optical frequency;
scrambling optical polarization modes of any optical signal carried on said multi-mode optical waveguide; and
separating out a selected optical component of said multi-frequency optical signal scrambled by said scrambling step.

18. A communication method as recited in claim 16, wherein said separating step separates a differing portion of said multi-frequency optical signal dependent upon a polarization state of said multi-frequency optical signal.

* * * * *